United States Patent
Shetty et al.

(10) Patent No.: US 8,391,872 B1
(45) Date of Patent: Mar. 5, 2013

(54) USE OF CALL DROP AND RE-ORIGINATION DATA TO TRIGGER HANDOFF

(75) Inventors: Manoj Shetty, Overland Park, KS (US); Sachin R. Vargantwar, Overland Park, KS (US); Siddharth S. Oroskar, Overland Park, KS (US); Ashvini G. Canjeevaram, Burlington, MA (US)

(73) Assignee: Sprint Spectrum L.P., Overland Park, KS (US)

( * ) Notice: Subject to any disclaimer, the term of this patent is extended or adjusted under 35 U.S.C. 154(b) by 1312 days.

(21) Appl. No.: 11/779,023

(22) Filed: Jul. 17, 2007

(51) Int. Cl.
*H04W 36/00* (2009.01)
(52) U.S. Cl. .................. 455/443; 455/421; 370/331
(58) Field of Classification Search .......... 455/436–453, 455/421
See application file for complete search history.

(56) References Cited

U.S. PATENT DOCUMENTS

| | | | |
|---|---|---|---|
| 6,097,953 A * | 8/2000 | Bonta et al. | 455/436 |
| 6,266,529 B1 * | 7/2001 | Chheda | 455/436 |
| 7,076,245 B1 | 7/2006 | Satapathy | |
| 7,082,303 B2 * | 7/2006 | Sayeedi et al. | 455/439 |
| 7,133,675 B2 * | 11/2006 | Hunzinger | 455/436 |
| 7,349,699 B1 | 3/2008 | Kelly et al. | |
| 2003/0134637 A1 | 7/2003 | Cooper | |
| 2005/0260990 A1 * | 11/2005 | Huang et al. | 455/436 |
| 2007/0087752 A1 * | 4/2007 | Voyer et al. | 455/436 |
| 2008/0113670 A1 * | 5/2008 | Dufour et al. | 455/436 |

* cited by examiner

Primary Examiner — Vladimir Magloire

(57) ABSTRACT

A method and system for using call drop and re-origination data to trigger handoff of wireless communication devices. Handoff trigger data is established in response to detecting that at least one mobile station experienced a call drop and then quickly re-originated on a sector that was not included in the mobile station's active set at the time of the call drop. The handoff trigger data correlates a location where the call drop occurred with the sector on which re-origination occurred. When another mobile station is thereafter engaged in a call at or near that location and does not have the sector in its active set, a serving radio access network may direct the mobile station to handoff to the sector, in an effort to prevent a call drop.

18 Claims, 5 Drawing Sheets

HANDOFF TRIGGER AREAS
BASED ON CALL DROPS FOLLOWED BY
RE-ORIGINATIONS ON STRONG SECTORS

USE OF CALL DROP AND RE-ORIGINATION DATA TO TRIGGER HANDOFF

FIELD OF THE INVENTION

The present invention relates to wireless communications and, more particularly, to determinations of which sector or sectors in a cellular wireless network should serve a given mobile station.

BACKGROUND

Cellular wireless is an increasingly popular means of personal communication in the modern world. People are using cellular wireless networks for the exchange of voice and data over cellular telephones, Personal Digital Assistants ("PDAs"), cellular modems, and other devices. In principle, a user can seek information over the Internet or call anyone over a Public Switched Telephone Network ("PSTN") from any place inside the coverage area of the cellular wireless network.

In a typical cellular wireless system, an area is divided geographically into a number of cell sites provided by a radio access network (RAN). The RAN typically comprises one or more base transceiver stations (BTSs), each of which has one or more antennas that radiate to define a radio frequency (RF) radiation pattern. The BTS(s) of the RAN may then be coupled with a base station controller (BSC) or radio network controller (RNC), which may in turn be coupled with a telecommunications switch or gateway, such as a mobile switching center (MSC) or packet data serving node (PDSN) for instance. The switch or gateway may then provide connectivity with a transport network, such as the public switched telephone network (PSTN) or the Internet for instance.

When a mobile station (such as a cellular telephone, a wirelessly equipped PDA or personal computer, or another suitably equipped device) is positioned in a cell, the mobile station communicates via an RF air interface with the BTS of the cell. Consequently, a communication can be established between the mobile station and another entity, via the air interface and the RAN. Such a communication may be referred to as a "call," whether the communication is a traditional voice "call" or a more advanced data session, generally regardless of its content.

With the explosive growth in demand for wireless communications, the level of call traffic in most cell sites has increased drastically over recent years. To help manage the call traffic, most cells in a wireless network are usually further divided geographically into a number of sectors (which can be visualized ideally as pie pieces), each defined respectively by radiation patterns from directional antenna components of the respective BTS, or by respective BTS antennae.

In a Code Division Multiple Access (CDMA) wireless network and perhaps in other types of networks, each cell employs one or more carrier frequencies, and each sector is distinguished from adjacent sectors by a pseudo-random number offset (PN offset). Further, each sector may concurrently communicate on multiple different channels, distinguished by "Walsh codes". When a mobile station operates in a given sector, communications between the mobile station and the BTS of the sector are carried on a given frequency and are encoded by the sector's PN offset and, perhaps, a given Walsh code.

According to well known industry standards, a mobile station can communicate with a number of "active" sectors at a time. Depending on the system, the number of active sectors may be up to three or six, for instance. The mobile station receives largely the same signal from each of the active sectors and, on a frame-by-frame basis, may select the best signal to use.

A mobile station maintains in its memory a list of the sectors in its "active" set. In addition, it maintains in its memory a list of "candidate" sectors (e.g., up to six), which are those sectors that are not yet in the active set but that have sufficient signal strength that the mobile station could demodulate signals from those sectors. Further, the mobile station maintains a list of "neighbor" sectors, which are those sectors not in the active set or candidate set but are in close vicinity to the mobile station. All other possible sectors are members of a "remaining" set.

In existing systems, to facilitate a determination of which sectors should be in the mobile station's active set, all base stations emit a pilot channel signal, typically at a power level higher than other downlink signals. A mobile station then constantly measures the strength ($E_c/I_o$, i.e., energy versus spectral density) of each pilot that it receives and notifies a primary base station (a base station currently serving the mobile station) when pilot strength falls above or below designated thresholds. The base station, in turn, provides the mobile station with an updated list of active pilots.

In one arrangement, for instance, the base station may initially transmit to the mobile station (e.g., over a downlink control channel or traffic channel) a Handoff Direction Message (HDM), containing parameters such as (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

Additionally, the base station may initially provide the mobile station with a Neighbor List Update Message (NLUM), which identifies the "neighbor" sectors for the current active set.

The mobile station may then monitor all of the pilot signals that it receives, and the mobile station may determine if any neighbor pilot exceeds T_ADD by T_. If so, the mobile station may add the pilot to its "candidate" set and send a Pilot Strength Measurement Message (PSMM) to the base station, indicating the estimated $E_c/I_o$ for the pilot. Depending on current capacity and other issues, the base station may then send an HDM to the mobile station, listing the pilot as a new member of the active set, or directing the mobile station to add the pilot to the active set. Upon receipt of the HDM, the mobile station would then add the pilot to its active set as instructed, and the mobile station would send a Handoff Completion Message (HCM) to the base station, acknowledging the instruction, and providing a list of the pilots (PN offsets) in its active set.

Similarly, if the mobile station detects that the signal strength of a pilot in its active set drops below T_DROP, the mobile station may start a handoff drop timer. If T_TDROP passes, the mobile station may then send a PSMM to the base station, indicating the $E_c/I_o$ and drop timer. The base station may then respond by sending an HDM to the mobile station, without the pilot in the active set, or directing the mobile station to remove the pilot from the active set. The mobile station would then receive the HDM and responsively move the pilot to its neighbor set and send an HCM to the base station.

When a mobile station is actively engaged in a call, if RF signal strength received by the mobile station on each on each sector of its active set becomes too low and the mobile station does not have a chance to add a sufficiently strong sector to its active set, the RF link between the mobile station and RAN will be effectively cut off, which will thereby disconnect or "drop" the call.

This can happen for a number of reasons. For example, one or more sectors may be missing from the neighbor list associated with the mobile station's current active set sectors. In certain systems, a RAN may preclude handoff to a sector not in the mobile station's neighbor list. Thus, if the mobile station that is actively engaged in a call moves into an area where the mobile station loses contact with its active set sectors and seeks to hand off to a sector that is not in its neighbor list, the mobile station may experience a call drop. As another example, if the mobile station is moving quickly or traveling through RF obstructions, the mobile station may detect a strong pilot on a sector in its neighbor list but may not have time to send a PSMM for that pilot and receive an HDM directing handoff to that pilot before the mobile station loses contact with its current active set sectors. In that case as well, the mobile station may experience a call drop. Other situations may give rise to call drops as well.

SUMMARY

An exemplary embodiment of the invention involves applying a unique process to identify a geographic area in which call drops tend to occur and in which, after such call drops occur, mobile stations tend to re-originate on a particular sector. In turn, the process then involves detecting that a mobile station is engaged in a call in the identified geographic area and does not have the particular sector in its active set, and then responsively triggering a handoff of the mobile station to the particular sector.

By way of example, the process may involve a RAN detecting that, when a mobile station was at a particular geographic location and was engaged in a call with active set sectors A, B, and C, the mobile station experienced a call drop and then shortly thereafter (e.g., within some threshold time period) re-originated on sector D, where sector D was not in the mobile station's active set. Based on that occurrence, the RAN could then conclude that if a mobile station is thereafter engaged in a call at or near that geographic location and similarly does not have sector D in its active set, the mobile station may likewise experience a dropped call. To help avoid such a dropped call, the RAN may then responsively direct the mobile station to hand off to sector D. For instance, the RAN may send to the mobile station an HDM that directs the mobile station to add sector D to its active set (e.g., by providing the mobile station with a new active set including sector D).

Further, it may be sensible to limit application of this process to situations where the particular sector on which the mobile station re-originated was an especially strong sector at the time (or shortly thereafter), since other mobile stations could then more likely benefit by handing off to that strong sector and thus possibly avoiding a call drops. One way to determine that the sector on which the mobile station re-originated was especially strong is to consider any PSMMs or other signaling messages that the mobile station (or other mobile stations, for that matter) transmitted to the RAN for that particular sector. For instance, at the time of re-originating or shortly after re-originating, if the mobile station sends a PSMM that indicates an $E_c/I_o$ of about −9 dB or −8 dB for the sector on which it re-originated, a reasonable conclusion is that the sector is especially strong and that it would be sensible to direct other mobile stations in a similar predicament to hand off to that sector.

As presently contemplated, a RAN implementing the invention may thus establish a set of handoff trigger data that defines a geographic area in which call drops tend to occur followed by re-origination on a particular strong sector. The RAN may establish the geographic area by recording each location where a call drop occurs in a scenario where the call drop is followed by re-origination on a particular strong sector.

For instance, the RAN may detect one or more instances in which mobile stations experienced call drops when the mobile stations did not have sector D in their active sets and then shortly thereafter re-originated on sector D and reported threshold high signal strength of sector D. For each such instance, the RAN may then determine the mobile station location where the call drop occurred. In turn, the RAN may establish as the geographic handoff trigger area an area made up of circles or other shapes bounding each such location, whether the total geographic handoff trigger area is contiguous or non-contiguous. In the process, the RAN may establish in data storage a set of handoff trigger data that correlates that geographic handoff trigger area with sector D. That way, whenever the RAN thereafter detects that a mobile station is engaged in a call when at a location falling with that geographic area and that the mobile station does not have sector D in its active set, the RAN may programmatically direct the mobile station to hand off to sector D, in an effort to avoid a call drop.

These as well as other aspects and advantages will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
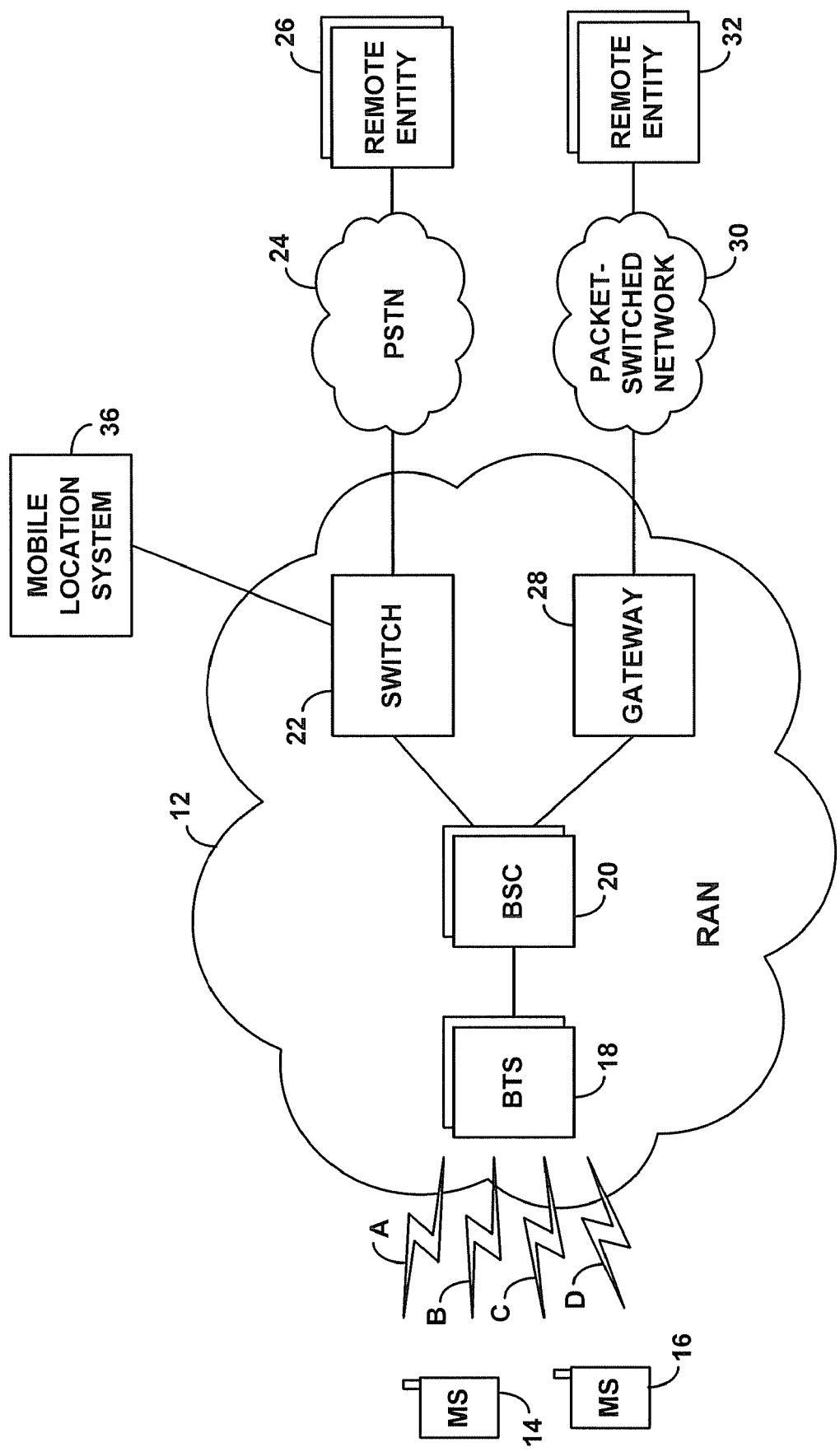
FIG. 1 is a simplified block diagram of a communication system for which an exemplary embodiment of the invention can be applied.

Referring to the drawings, FIG. 1 depicts a cellular communication system for which aspects of the exemplary embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, and/or hardware.

As shown in FIG. 1, the example communication system includes at its core a RAN 12 that is arranged to provide multiple mobile stations with wireless communication service. FIG. 1 depicts two representative mobile stations 14, 16 by way of example, either or each of which could be a cell phone, wirelessly equipped PDA, or other type of wirelessly-equipped device now known or later developed. Each mobile station is equipped with hardware, software, and/or other logic to communicate with RAN 12 in a known manner in accordance with an agreed communication protocol, such as CDMA (e.g., IS-95, IS-2000, 1xRTT, 1xEV-DO, etc.), iDEN, WiMAX, TDMA, AMPS, GSM, GPRS, UMTS, EDGE, or any other communication protocol now known or later developed.

RAN 12 defines a plurality of sectors (i.e., any wireless coverage areas established by reference to base station emissions or the like) in which mobile stations can communicate with the RAN. In particular FIG. 1 shows the RAN radiating to define at least four sectors, labeled respectively A, B, C, and D. The RAN may define these sectors discretely through use of directional antennas and/or by various modulation parameters, including, without limitation, carrier frequencies and PN offsets or other parameters, depending on the air interface protocol used. In practice, the sectors may overlap to some extent, so that a served mobile station can communicate with multiple sectors when at particular location.

The RAN can take various forms and may include any of a variety and number of components, depending for instance on the air interface protocol employed by the RAN. For example, the RAN may include one or more base transceiver stations (BTSs) 18 and one or more base station controllers (BSCs) 20 (also sometimes referred to as radio network controllers (RNCs)). The BTSs preferably include directional antennas, power amplifiers, and associated transceiver equipment arranged to establish the sectors shown and to communicate with served mobile stations. As such, some or all of sectors A, B, C, and D may emanate from a single BTS (i.e., a single cell site), or various ones of the sectors may emanate from separate BTSs.

In turn, each BSC 20 may control one or more BTSs and may manage aspects of air interface operation. For instance, a BSC may manage assignment of air interface traffic channels to mobile stations in response to mobile station origination messages. In particular, when a mobile station seeks to initiate a communication, such as to place a voice call or initiate data session, the mobile station may identify a local carrier frequency and a strongest sector (e.g., a strongest pilot signal) on that carrier, and the mobile station may then transmit an origination request "access probe" on that sector. Autonomously, or upon instruction from another controlling entity such as a switch, the BSC may then assign air interface resources to the mobile station for use to engage in the requested call, and, perhaps after additional setup, the call may proceed.

Further, the BSC may manage handoff of mobile stations between sectors, by engaging in control channel signaling such as that described above. For instance, the BSC may first transmit to the mobile station a neighbor list for the mobile station's initially selected sector. The BSC may then receive PSMMs from the mobile station, reporting on pilot signal strengths detected by the mobile station, and the BSC may send HDMs to the mobile station, directing the mobile station to add or remove particular sectors from the mobile station's active set, i.e., to hand off from one sector to another as described above.

Each BSC may be coupled with a mobile switching center (MSC) or other switch 22 that provides connectivity with the public switched telephone network (PSTN) 24 if applicable, so that served mobile stations can communicate with remote entities 28 on the PTSN. And each BSC may be coupled with a packet data serving node (PDSN) or other gateway 30 that provides connectivity with a packet-switched network 32 if applicable, so that served mobile stations can communicate with remote entities 34 on the packet-switched network.

The example communication system of FIG. 1 also includes a mobile positioning system that facilitates determination of the location of mobile stations in accordance with well known principles. As shown in FIG. 1, for instance, a mobile location system (MLS) 36 can be linked with MSC 22 or another RAN element via a signaling network and/or via a general packet-data network. The MLS 36 may function as a location server, able to maintain records of mobile station location and to report mobile station locations to querying entities. The MLS may determine the location of a mobile station through interaction with position determining equipment (not shown), which may be network-based (e.g., triangulation mechanisms) or handset-based (e.g., GPS-based).

For high precision location determination, the MLS 36 may engage in signaling with the mobile station itself, according to well known industry standard IS-801 for example. In that process, the mobile station may report cellular signal measurements to the MLS, the MLS may use those measurements to determine roughly where the mobile station is located, and the MLS may then provide the mobile station with appropriate satellite assistance data to enable the mobile station to tune to particular satellites in its area. Based on signals that the mobile station then receives from those satellites, the mobile station or the MLS may then compute the mobile station's location with a high degree of accuracy. And the MLS may report that determined location to a querying entity. By the same token, some other entity (such as a RAN entity) may directly request the mobile station to report the mobile station's GPS-determined location, and the mobile station may compute its location by reference to satellite signals and then return its reported location to the querying entity.

Figure 2:
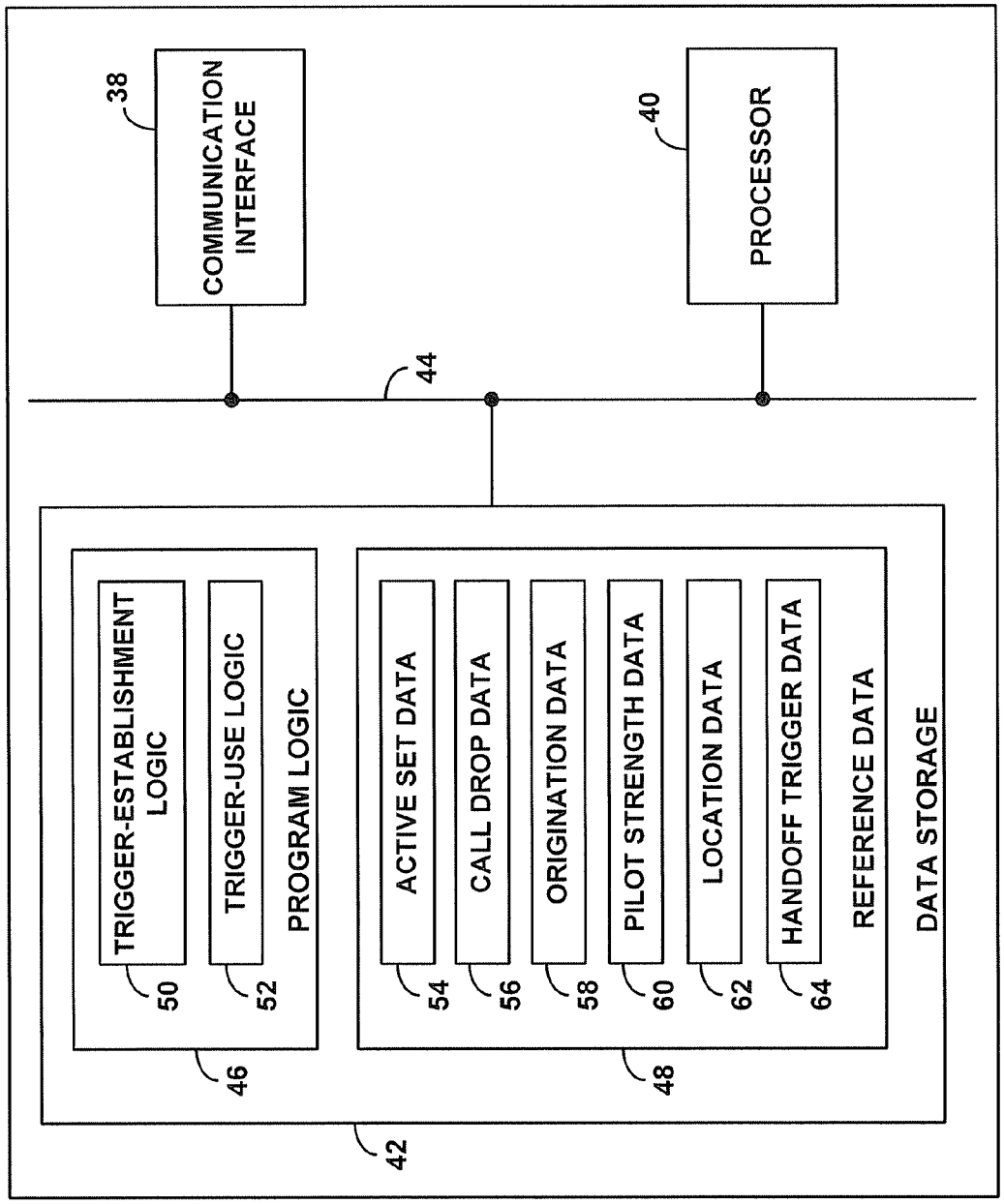
FIG. 2 is a simplified block diagram of an entity arranged to implement aspects of the exemplary embodiment.

Aspects of the present invention may be carried out by one or more entities shown in FIG. 1, or by one or more other entities. For instance, aspects may be carried out by BTS 18, BSC 20, by switch 22, and/or by some other entity (such as a controlling server (not shown) coupled with the various entities shown). FIG. 2 is a simplified block diagram depicting functional components of such an entity (e.g., combination of entities). As shown, the entity includes by way of example a communication interface 38, a processor 40, and data storage 42, coupled together by a system bus, network, or other connection mechanism 44.

Communication interface 38 may include one or more communication interface mechanisms that enable the entity to communicate with various other entities. As such, the communication interface may take various well known forms, depending factors such as the type of communication links in use. Processor 40 may comprise one or more general purpose processors (e.g., INTEL processors) and/or one or more specialized processors (e.g., digital signal processors and/or application specific integrated circuits). And data storage 42 may comprise one or more volatile and/or non-volatile storage components, such as optical, magnetic, or organic storage components and may integrated in whole or in part with processor 40.

As shown, data storage 42 may hold program logic 46 and reference data 48. The program logic 46 may comprise machine language instructions executable by processor 40 to carry out various functions described herein. For instance, the program logic 46 may include trigger-establishment logic 50 that is executable by the processor to automatically establish handoff trigger data based on an analysis of call drops followed by re-originations on strong sectors. And as another example, the program logic 46 may include trigger-use logic 52 that is executable to use such established handoff trigger data to trigger handoff of a mobile station. In an alternative embodiment, the act of establishing the handoff trigger data could be carried out through post-processing analysis of call drop data and origination data, possibly by a human being and/or a separate computer system. For optimal utility, however, the act of using the handoff trigger data to trigger handoff of a mobile station is preferably performed automatically and dynamically by the RAN or another entity that controls handoff.

The reference data 48 then includes various data that the processor may write, read, and/or use, in accordance with the exemplary embodiment. As shown, for instance, the reference data 48 may include (i) active set data 54, (ii) call drop data 56, (iii) origination data 58, (iv) pilot strength data 60, (v) location data 62, and (vi) handoff trigger data 64, among other data.

The active set data 54 may comprise data indicating the active set of each currently served mobile station, keyed to mobile station identifier and time. When a mobile station first originates a call, the mobile station's active set may consist of just the sector on which the mobile station originated the call, and the RAN (e.g., BSC) may record that fact. In turn, through PSMM and HDM messaging or the like, the RAN may revise the mobile station's active set and may update the active set data 54 accordingly, to maintain a record of the mobile station's active set over time.

The call drop data 56 comprises data indicating call drops experienced by mobile stations, also keyed to mobile station identifier and also possibly having timestamps indicating when the call drop events (call drops) occurred. Usually, a call drop event occurs because the strength of RF signals receive by the mobile station and/or by the base station (from the mobile station) becomes too low, and the RF link is lost. However, other circumstances such as those described above may cause a call drop event as well.

Generally, a call drop event should be distinguished from a normal cessation of a call, where the mobile station and/or base station sends to the other an end-of-call signal of some sort. The RAN (e.g., BSC) may thus detect a call drop event by detecting that data has stopped flowing over the traffic channel between the RAN and the mobile station when the RAN has not received an end-of-call signal from the mobile station and has not sent an end-of-call signal to the mobile station. When the RAN detects a call drop event, the RAN may record the call drop event in the call drop data 56. Further, the occurrence of the call drop event may programmatically trigger processor 40 to determine whether the mobile station thereafter re-originates on a stronger sector and so forth according to the exemplary embodiment as described herein.

The origination data 58 comprises data indicating originations by mobile stations, also keyed to mobile station identifiers and also possibly with timestamps indicating when the originations occurred. When the RAN (e.g., BSC) receives from the mobile station an origination request transmitted on a particular sector, the RAN may record in the origination data 58 an indication that the mobile station originated a call on that sector. Further, by comparing the time of such an origination by the mobile station with the time of a call drop recently experienced by the mobile station, processor 40 may determine that the origination occurred within a predefined threshold period following the call drop, which may cause processor to update the handoff trigger data as described further below.

The pilot strength data 60 comprises data indicating pilot signal strengths reported by mobile stations, also possibly keyed to mobile station identifier and having timestamps indicating when the reports were received or established. As discussed above, after a mobile station originates a call, the mobile station may send PSMMs or similar messages (depending on the protocol) to the RAN, indicting pilot strength measurements taken by the mobile station. The RAN (e.g., BSC) may then record those pilot strength measurements per sector, with timestamps, in the pilot strength data 60. Further, in an instance where the mobile station has experienced a call drop and has then re-originated within a threshold time after the call drop, processor 40 may use the received pilot strength data to determine that the sector on which the mobile station re-originated has a threshold (i.e., at least a threshold) signal strength, preferably to justify establishment or addition of handoff trigger data based on that call drop.

The location data 62 comprises data indicating the location of mobile stations over time. For each mobile station currently engaged in a call and served by the RAN, the RAN (e.g., BSC) may periodically or otherwise query the mobile station and/or the MLS 36 for a high accuracy reading of the mobile station's location, and the RAN may record the location of the mobile station over time in the location data 62. That way, processor 40 can determine where a mobile station was located when the mobile station experienced a call drop. Further, the processor can determine that a mobile station has entered or is headed into an established handoff trigger area, which can trigger handoff of the mobile station to a stronger sector in accordance with the exemplary embodiment.

The handoff trigger data 64 comprises data that correlates one or more geographic areas with one or more sectors to which handoff could be triggered when mobile stations are located in the geographic areas. In the exemplary embodiment, the handoff trigger data 64 may take the form of a table that lists in one column various geographic areas (each defined as polygons by latitude/longitude nodes, as circles, or as other shapes for instance) and in another column a target sector corresponding respectively with each geographic area. The handoff trigger data may take other forms as well, including additional or other information, such as active set data for mobile stations that experienced dropped calls giving rise to particular handoff trigger data, and/or other data.

Further, the handoff trigger data could be time (e.g., time, day, date, etc.) based, such that the data is set to apply at particular times and not at other times. To facilitate this, processor 34 could include time limitations in the handoff trigger data, possibly designating a particular handoff trigger area (and corresponding target sector) to be applicable at or around a time of day when the underlying call drop (that gave rise to the handoff trigger data) occurred. Other time related restrictions could be imposed as well.

Figure 3:
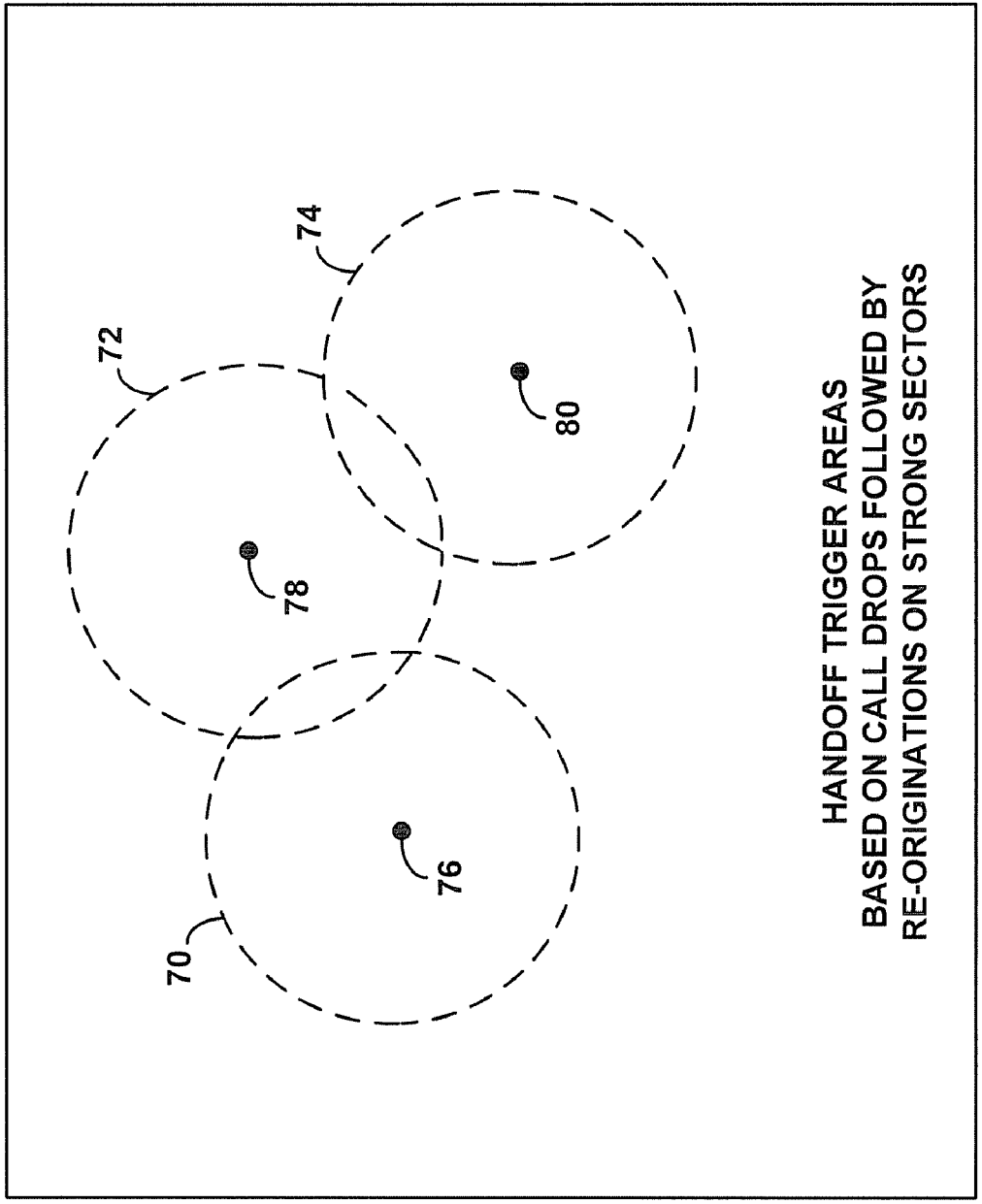
FIG. 3 is a simplified depiction of a geographic regions having various handoff trigger areas established in accordance with the exemplary embodiment.

FIG. 3 is a simplified depiction of a geographic region having various geographic areas that could be represented by handoff trigger data 64 in accordance with the exemplary embodiment. In particular, FIG. 3 shows three representative geographic areas 70, 72, 74, each of which takes the form of a circle (e.g., with a radius of 100 feet or some other distance) centered respectively around a geographic location point 76, 78, 80. In accordance with the exemplary embodiment, each of these geographic areas could be added to the handoff trigger data when a mobile station at the center location experiences a call drop and then quickly re-originates on a strong sector that was not in the mobile station's active set. All of the areas shown in FIG. 3 may be correlated with the same target sector, if the call drop at each location was followed by re-origination on that sector. Alternatively, one or more of the areas shown may have a different target sector, if the call drop at the center location was followed by re-origination on that different sector.

Using the reference data 48 in practice, processor 40 may determine that a given mobile station engaged in a call has entered into area 70 and that the mobile station does not have the corresponding target sector in the mobile station's active set. In response, the processor 40 may then direct the mobile station to hand off to the target sector, by sending an HDM to the mobile station for instance, thereby helping to avoid a possible call drop.

Figure 4:
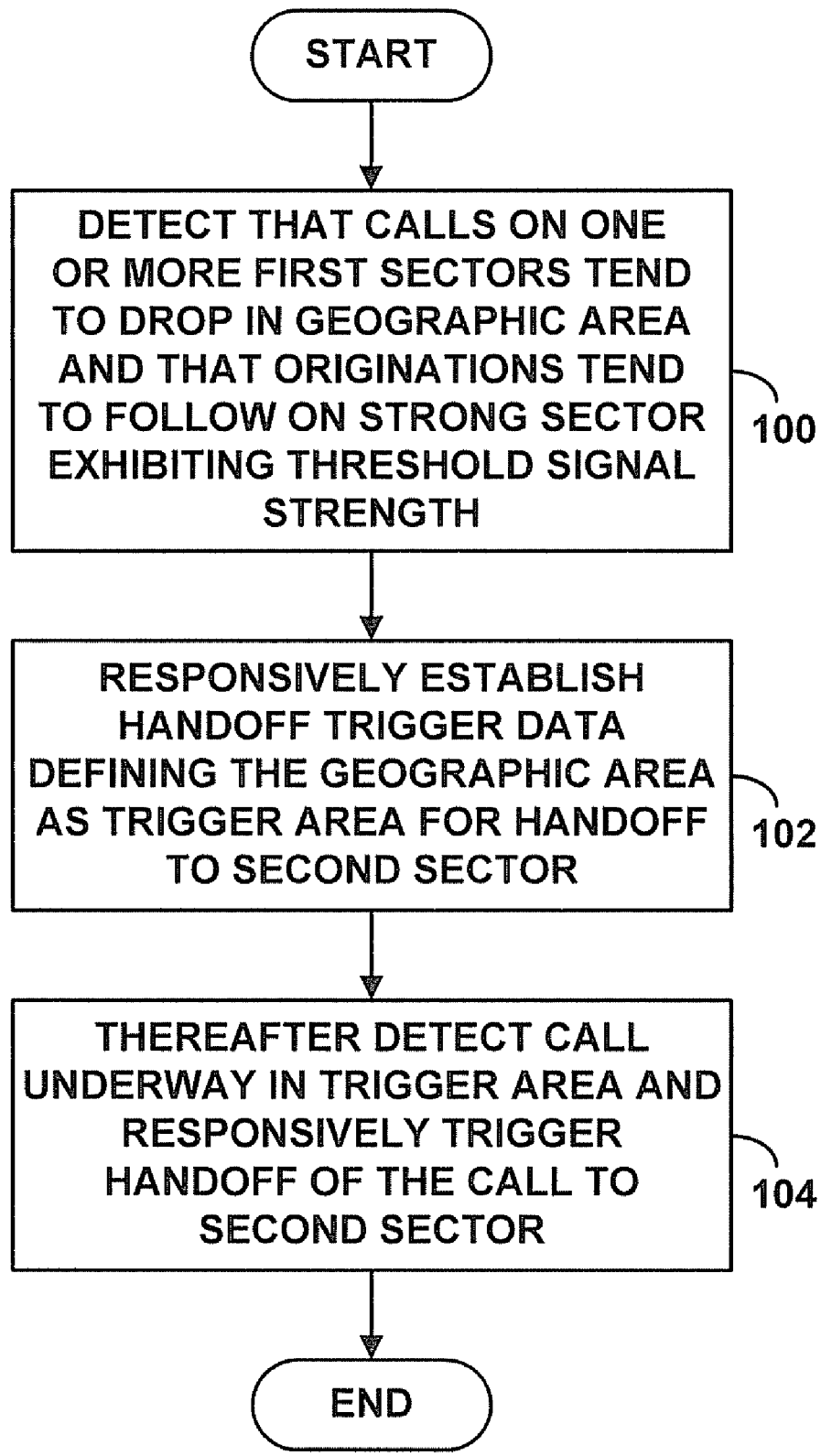
FIG. 4 is a flow chart depicting functions that can be carried out in accordance with the exemplary embodiment.

FIG. 4 is a flow chart depicting in summary a set of functions that can be carried out in accordance with the exemplary embodiment. The method would be carried out, at least in part, by a RAN that defines and thus serves at least a first sector and a second sector. For instance, as noted above, aspects of the method may be carried out at a BTS, BSC, or MSC, or some other entity.

As shown in FIG. 4, at step 100, the exemplary method involves detecting that calls on one or more first sectors tend to drop in a geographic area and that re-originations then tend to occur on a second sector that exhibits a threshold signal strength. In turn, at step 102, the method involves responsively establishing handoff trigger data that defines the geographic area as a trigger area for handoff to the second sector. And at step 104, the method involves thereafter detecting that a call is underway in the trigger area and responsively triggering a handoff of the call to the second sector.

In this exemplary method, the act of detecting that calls on one or more first sectors tend to drop in the geographic area and that re-originations then tend to occur on the second sector that exhibits the threshold signal strength may involve (i) determining that a mobile station experienced a call drop at a time when an active set of the mobile station included the one or more first sectors, (ii) determining a location of the mobile station at the time, and establishing as the geographic area an area bounding that determined location, (iii) determining that, within a threshold time period after the call drop, the mobile station originated a call on the second sector and that the second sector was not in the mobile station's active set at the time of the call drop and (iv) determining that the mobile station reported a threshold high signal strength received on the second sector.

In this regard, the determined location (i.e., the location where the call drop occurred, or in an acceptable embodiment an approximation of the call drop location) may take the form of a point having geographic coordinates, and the RAN may identify that point through use of well known position determining techniques, as defined by industry standard IS-801 for instance. Further, the act of establishing as the geographic area the area bounding the determined location may involve establishing as the geographic area an area extending a predefined radius around the point.

In addition, the act of determining that the mobile station reported a threshold high signal strength received on the second sector may involve the RAN receiving from the mobile station at least one PSMM for the second sector, where the at least one PSMM specifies the threshold high signal strength of a pilot that the mobile station received on the second sector.

As a general matter, the act of detecting a tendency for calls on one or more first sectors to drop when in the geographic area and a tendency for re-originations to then occur on the second sector exhibiting high signal strength may thus involve a detecting a single instance of that happening, as it is reasonable to conclude that if a single instance occurs, there is a tendency for largely the same thing to occur again.

On the other hand, the act of detecting a tendency for calls one or more first sectors to drop when in the geographic area and a tendency for re-originations to then occur on the second sector exhibiting a high signal strength may involve consideration of multiple such instances. For example, it may involve (i) detecting multiple instances of mobile stations experiencing call drops at times when active sets of the mobile stations included the one or more first sectors but did not include the second sector, (ii) determining for each instance that the mobile station that experienced the call drop thereafter originated a call on the second sector within a threshold period after the time the mobile station experienced the call drop and that the mobile station then reported a threshold high signal strength received on the second sector, (iii) determining for each instance a location of the mobile station that experienced the call drop at the time the mobile station experienced the call drop, and establishing as the geographic area an area bounding each determined location (i.e., an area that bounds all of those determined locations).

Similarly in this method, each determined location may define a point that has geographic coordinates, and the act of establishing as the geographic area the area bounding each determined location may involve establishing as the geographic area an area extending at least a predefined radius around each point. In addition, the act of determining that a mobile station reported a threshold high signal strength received on the second sector may similarly involve receiving from the mobile station at least one PSMM for the second sector, where the at least one PSMM specifies the threshold high signal strength of a pilot that the mobile station received on the second sector.

In addition, the act of establishing the handoff trigger data that defines the geographic area as a trigger area for handoff to the second sector may involve recording in data storage, as at least part of the handoff trigger data, a correlation between the geographic area and the second sector. In practice, this correlation may be one of many recorded in the handoff trigger data. Thus, the handoff trigger data may include multiple correlations between geographic areas and second sectors, including a correlation between the established geographic area and the second sector.

In turn, the act of detecting that a call is underway in the trigger area and triggering a handoff based on the data may involve (i) determining a location of a given mobile station engaged in the call, and using the handoff trigger data to identify the trigger area encompassing the determined location and to identify the second sector as corresponding with the trigger area, and (ii) determining that the identified second sector is not currently within an active set of the mobile station, and responsively directing the given mobile station to hand off to the second sector, such as by sending to the given mobile station an HDM that directs the mobile station to include the second sector in the mobile station's active set.

Figure 5:
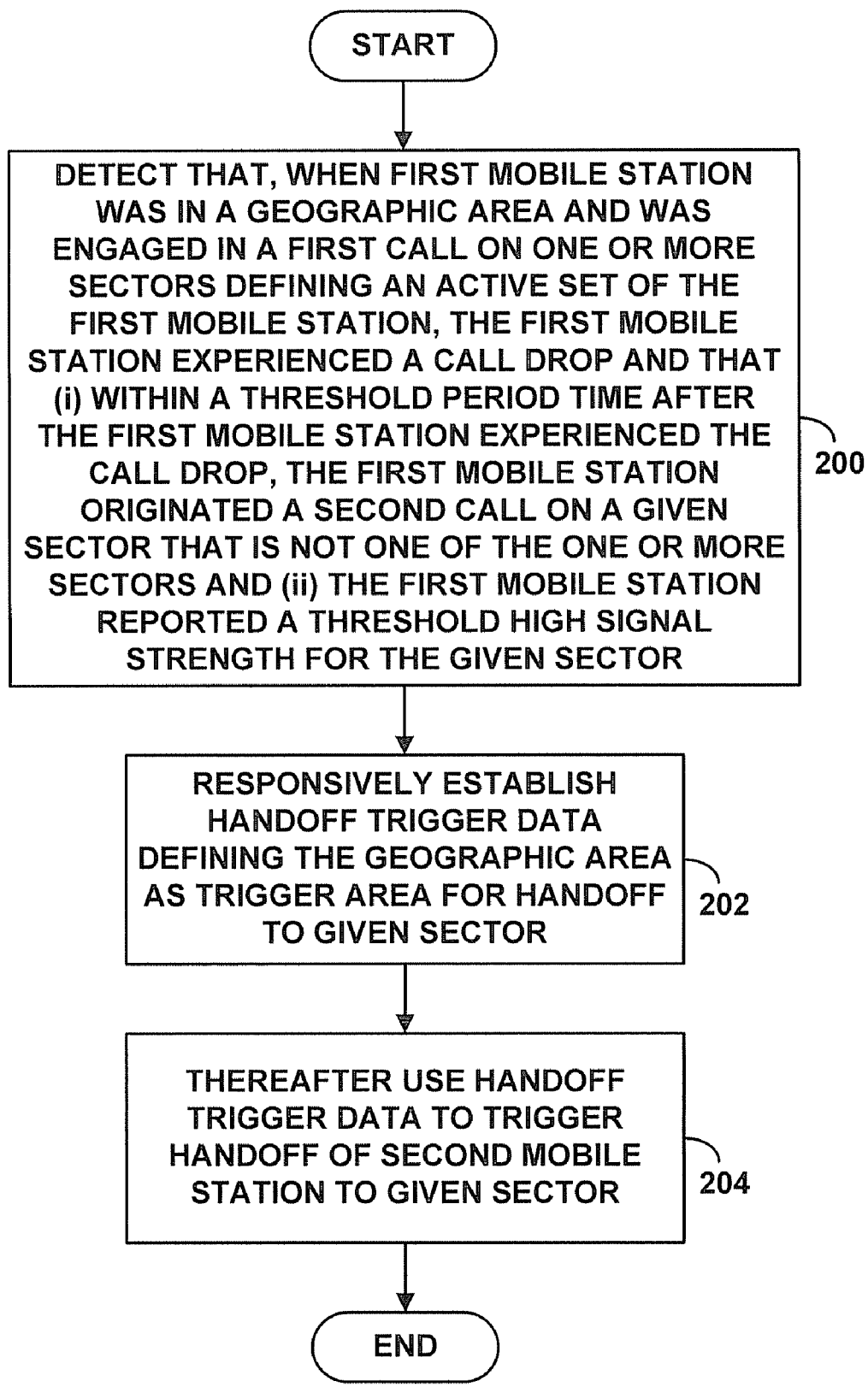
FIG. 5 is another flow chart depicting functions that can be carried out in accordance with the exemplary embodiment.

FIG. 5 is next a flow chart depicting in summary another set of functions that can be carried out in accordance with the exemplary embodiment. The method could likewise be carried out, at least in part, by a RAN that defines and thus serves at least a first sector and a second sector.

As shown in FIG. 5, at step 200, the method involves detecting that, when a first mobile station was in a geographic area and was engaged in a first call on one or more sectors defining an active set of the first mobile station, the first mobile station experienced a call drop and that (i) within a threshold period time after the first mobile station experienced the call drop, the first mobile station originated a second call on a given sector that is not one of the one or more sectors and (ii) the first mobile station reported a threshold high signal strength for the given sector. At step 202, the method then involves, in response to the detecting of step 200, establishing handoff trigger data that defines the geographic area as a trigger for handoff to the given sector. Further, at step 204, the method involves subsequently using the handoff trigger data to trigger handoff of a second mobile station to the given sector.

In the exemplary method, the detecting function may further involve determining a location of the first mobile station when the first mobile station experienced the call drop, and establishing as the geographic area an area bounding the determined location. Thus, the act of detecting that the first mobile station experienced the call drop when the first mobile station was in the geographic area may involve establishing the geographic area in that manner and then determining that when the mobile station experienced the call drop, the mobile station was in that established geographic area.

In addition, as in the method described above, the act of using the handoff trigger data to trigger handoff of the second mobile station to the given sector may involve (i) making a determination that the second mobile station is engaged in a third call in the geographic area and that the given sector is not in an active set of the second mobile station, and (ii) in response to the determination, triggering handoff of the second mobile station to the given sector. Further, the act of triggering handoff of the second mobile station to the given sector may similarly involve sending to the second mobile station an HDM or the like that directs the second mobile station to add the second sector to the active set of the second mobile station.

Also as in the embodiment described above, the handoff trigger data may include multiple handoff-trigger correlations of geographic areas with sectors to which handoff should be directed. For instance, as noted above, the handoff trigger data may take the form of a table that correlates various geographic areas with target sectors. And one such handoff-correlation could be a correlation of the established geographic location (as described above) with the given sector.

An exemplary embodiment of the invention has been described above. Those of ordinary skill in the art will appreciate, however, that modifications may be made while remaining within the scope of the invention as defined by the claims.

We claim:

1. A method for a cellular wireless communication system that defines a plurality of sectors, the method comprising:
   detecting that calls on one or more first sectors tend to drop in a geographic area and that re-originations then tend to occur on a second sector that exhibits a threshold signal strength, wherein detecting that calls on one or more first sectors tend to drop in the geographic area and that re-originations then tend to occur on the second sector that exhibits the threshold signal strength comprises (i) determining that a mobile station experienced a call drop at a time when an active set of the mobile station included the one or more first sectors, (ii) determining a location of the mobile station at the time, and establishing as the geographic area an area bounding the determined location, (iii) determining that, within a threshold time period after the call drop, the mobile station originated a call on the second sector and that the second sector was not in the mobile station's active set at the time of the call drop, and (iv) determining that the mobile station reported a threshold high signal strength received on the second sector;
   in response to at least the detecting, establishing handoff trigger data that defines the geographic area as a trigger area for handoff to the second sector; and
   thereafter detecting that a call is underway in the trigger area and, based on the handoff trigger data, responsively triggering a handoff of the call to the second sector.

2. The method of claim 1, further comprising carrying out the method at a radio access network that serves the first sector and second sector.

3. The method of claim 1, wherein the determined location defines a point having geographic coordinates, and wherein establishing as the geographic area the area bounding the determined location comprises:
   establishing as the geographic area an area extending a predefined radius around the point.

4. The method of claim 3, wherein determining that the mobile station reported a threshold high signal strength received on the second sector comprises receiving from the mobile station at least one pilot strength management message (PSMM) for the second sector, the at least one PSMM specifying the threshold high signal strength received on the second sector.

5. A method for a cellular wireless communication system that defines a plurality of sectors, the method comprising:
   detecting that calls on one or more first sectors tend to drop in a geographic area and that re-originations then tend to occur on a second sector that exhibits a threshold signal strength, wherein detecting that calls on one or more first sectors tend to drop in the geographic area and that re-originations then tend to occur on the second sector that exhibits the threshold signal strength comprises (i) detecting multiple instances of mobile stations experiencing call drops at times when active sets of the mobile stations included the one or more first sectors but did not include the second sector, determining for each instance that the mobile station that experienced the call drop thereafter originated a call on the second sector within a threshold period after the time the mobile station experienced the call drop and that the mobile station then reported a threshold high signal strength received on the second sector, and determining for each instance a location of the mobile station that experienced the call drop at the time the mobile station experienced the call drop, and establishing as the geographic area an area bounding each determined location;
   in response to at least the detecting, establishing handoff trigger data that defines the geographic area as a trigger area for handoff to the second sector; and
   thereafter detecting that a call is underway in the trigger area and, based on the handoff trigger data, responsively triggering a handoff of the call to the second sector.

6. The method of claim 5, wherein each determined location defines a point having geographic coordinates, and wherein establishing as the geographic area the area bounding each determined location comprises:
   establishing as the geographic area an area extending at least a predefined radius around each point.

7. The method of claim 5, wherein determining that the mobile station reported a threshold high signal strength received on the second sector comprises receiving from the mobile station at least one pilot strength management message (PSMM) for the second sector, the at least one PSMM specifying the threshold high signal strength received on the second sector.

8. The method of claim 1, wherein establishing handoff trigger data that defines the geographic area as a trigger area for handoff to the second sector comprises:
   recording in data storage as at least part of the handoff trigger data a correlation between the geographic area and the second sector.

9. The method of claim 8, wherein detecting that a call is underway in the trigger area and triggering a handoff based on the data comprises:
   determining a location of a given mobile station engaged in the call, and using the handoff trigger data to (i) identify the trigger area encompassing the determined location and (ii) to identify the second sector as corresponding with the trigger area; and
   determining that the identified second sector is not currently within an active set of the mobile station, and responsively directing the given mobile station to hand off to the second sector.

10. The method of claim 9, wherein directing the given mobile station to hand off to the second sector comprises sending to the given mobile station a handoff direction message that directs the mobile station to include the second sector in the mobile station's active set.

11. The method of claim 8, wherein the handoff trigger data comprises multiple correlations between geographic areas and second sectors, including a correlation between the geographic area and the second sector.

12. A method for a cellular wireless communication system that defines a plurality of sectors, the method comprising:
   detecting that, when a first mobile station was in a geographic area and was engaged in a first call on one or more sectors defining an active set of the first mobile station, the first mobile station experienced a call drop and that (i) within a threshold period time after the first mobile station experienced the call drop, the first mobile station originated a second call on a given sector that is not one of the one or more sectors and (ii) the first mobile station reported a threshold high signal strength for the given sector, wherein the detecting comprises determining a location of the first mobile station when the first mobile station experienced the call drop and establishing as the geographic area an area bounding the determined location;
   in response to the detecting, establishing handoff trigger data that defines the geographic area as a trigger for handoff to the given sector; and
   subsequently using the handoff trigger data to trigger handoff of a second mobile station to the given sector.

13. The method of claim 12, wherein using the handoff trigger data to trigger handoff of the second mobile station to the given sector comprises:
   making a determination (i) that the second mobile station is engaged in a third call in the geographic area and (ii) that the given sector is not in an active set of the second mobile station; and
   in response to the determination, triggering handoff of the second mobile station to the given sector.

14. The method of claim 13, wherein triggering handoff of the second mobile station to the given sector comprises sending to the second mobile station a handoff direction message that directs the second mobile station to add the second sector to the active set of the second mobile station.

15. The method of claim 12, wherein the given sector was not in a neighbor list of the first mobile station when the first mobile station experienced the call drop.

16. The method of claim 12, further comprising carrying out the method at a cellular radio access network that communicates with the first mobile station and the second mobile station according to a code division multiple access (CDMA) air interface protocol.

17. The method of claim 12, wherein the handoff trigger data comprises multiple handoff-trigger correlations of geographic areas with sectors, including a handoff-correlation of the geographic area with the given sector.

18. A radio access network comprising one or more base stations radiating to define a plurality of sectors, the radio access network being programmed with control logic to carry out functions including:
   detecting that a mobile station experienced a call drop when the mobile station was in a geographic area and was operating on one or more first sectors and that the mobile station then re-originated on a second sector that exhibits a threshold signal strength, wherein the detecting comprises (i) determining that a mobile station experienced the call drop at a time when an active set of the mobile station included the one or more first sectors, (ii) determining a location of the mobile station at the time, and establishing as the geographic area an area bounding the determined location, (iii) determining that, within a threshold time period after the call drop, the mobile station originated a call on the second sector and that the second sector was not in the mobile station's active set at the time of the call drop, and (iv) determining that the mobile station reported a threshold high signal strength received on the second sector;
   in response to at least the detecting, establishing handoff trigger data that defines the geographic area as a trigger area for handoff to the second sector; and
   thereafter detecting that a call is underway in the trigger area and, based on the handoff trigger data, responsively triggering a handoff of the call to the second sector.

* * * * *